Patented Dec. 23, 1947

2,433,193

UNITED STATES PATENT OFFICE 2,433,193

DRY, LIGHTWEIGHT, EXPANDED BENTONITE

Paul Bechtner, Chicago, Ill., assignor to American Colloid Company, Chicago, Ill., a corporation of South Dakota No Drawing. Application May 1, 1944, Serial No. 533,664

3 Claims. (Cl. 252—268.6)

This invention relates to methods of forming dry, lightweight clays, characterized by a lower apparent density than is exhibited by the same clay in its ordinary, natural, dry state; and to compositions of matter containing such novel forms of clay.

I have found that any clay which, in its natural, dry state, contains a substantial proportion of colloidal particles, or which is adapted to form a colloidal system with water—with or without the aid of a peptizing agent—can be treated by my novel method to form a dry, porous, or cellular product of substantially lower apparent density than the original dry clay. By "apparent density" I means the weight of unit volume of a sample of my novel dry clay when compared with the weight of the same unit volume of the dry, natural clay from which the novel product was derived; the weight in each case being taken of unpacked material, i. e., of material which has not been compressed in a manner to reduce the volume of air enclosed between the particles thereof.

In the practice of my novel method, I prefer to employ a hydrophilic type of colloidal clay, i. e., a naturally occurring, dry clay, the unit particles of which are adapted to swell in water when wetted. A typically hydrophilic clay of the character just mentioned is one which contains a major proportion of montmorillonite. Such a montmorillonitic clay is exemplified by the swelling bentonites, of which the so-called Wyoming bentonite, Black Hills bentonite, and sodium bentonite are types.

The physical difference between my novel products obtained, respectively, from a so-called non-swelling clay—such as a china clay, a ball clay, or fuller's earth—and a typical swelling clay of montmorillonitic type, is that in the former case the diminution in apparent density is largely due to air entrapped between the particles; whereas in the latter case, a much more marked diminution in apparent density is due not only to air entrapped between the particles, but also to air enclosed between the lattice sheets of montmorillonitic units which have expanded in water, and which retain their expanded shape when dry.

In the description hereinafter I shall use the term "sodium bentonite" as broadly representative of the montmorillonitic clays which may be employed in the practice of my novel process and which constitute essential ingredients in my preferred novel compositions. Although the subsequent description herein emphasizes the employment of a montmorillonitic clay in the practice of my invention, I desire it to be understood that I do not intend thereby to limit in any way the scope of my generic invention, but rather that the description merely embraces my preferred practice.

The hydrophilic character of a montmorillonite, i. e., the capacity of the ultimate particles to swell in water to many times their dry volume, is to a considerable extent a function of oxides of the alkali metals, particularly of sodium, in its crystal lattice structure. In bentonites which exhibit marked hydrophilic or water-swelling capacity the sodium content ordinarily exceeds the content of calicum. This may be correlated with the fact that sodium ions have a greater affinity for water than do calcium ions.

The ultimate structural unit of sodium bentonite is said to have an expandible lattice because it consists of a sheet of aluminum atoms—attached to oxygens and hydroxyls—lying between two sheets of silica tetrahedral groups. It is perhaps more accurate to say that such a unit expands in water than to say that it swells in water; because water molecules penetrate between the sheets and separate them, causing an expansion of the bentonite unit substantially in one direction, not unlike an accordion when extended.

Sodium bentonite, which has been expanded in water, will shrink back to approximately its original volume, and exhibit substantially the same apparent density that it did originally, when the added water is removed by drying. The lattice sheets which had been spread apart, return to their initial spacing.

I have discovered, however, that if a hydrosol or hydrogel of sodium bentonite be frozen so that all of the water present, including interplanar water between the lattice sheets, is in the form of ice, and if the ice be separated therefrom by sublimation or volatilization without melting, there remains a dry residue of the bentonite which is characterized by such light weight and fluffiness of appearance that I designate it as "fluff bentonite."

A principal object of my invention is to provide a novel method for forming a dry, lightweight clay, of artificially low apparent density.

A correlative principal object of my invention is to provide a novel composition of matter containing a dry, lightweight clay of artificially low apparent density.

Another object is to provide a novel composition of matter containing a dry montmorillonitic clay, the ultimate units whereof are in a substantially expanded state.

Another object is to provide a dry, montmorillonitic clay which is more readily dispersible in water than are the prepared bentonites of the prior art.

Another object is to provide a novel method of forming dry, lightweight compositions which contain a dry clay, of artificially lowered apparent density, physically integrated with fibrous materials, including wood pulp, bagasse, mineral wool, asbestos, fiber glass, natural wool, cotton linters, cellulosic fibers, and the like, in a form which it would be impossible to obtain merely by grinding or mixing together the dry, artificially lightweight clay and a dry fibrous material of the class just mentioned.

Another object is to provide a novel method of forming a fluff bentonite which is stiffened against compressive stresses by physical integration with substances capable of forming substantially rigid films in the dry state, e. g., starch paste, starch glue, water-dispersible casein products, animal glue, water-soluble resin polymers, and the like.

Another object is to provide a novel fluffy clay product which may be heated to incipient fusion, thereby forming a water-insoluble porous frit or sinter, suitable as a filter and a filtering medium, for acoustic or thermal insulation and for other uses where a substantially chemically inert, porous material is desired.

Another object is to provide a novel clay product which possesses an oil-absorptive capacity greater than that of any natural or proprietary oil absorbent of clay origin known to the art.

Another object is to provide a novel, dry, montmorillonitic clay, the ultimate units whereof are in an expanded state, and which is substantially free from gritty material of non-bentonitic character that normally is present in variable amounts in high-grade commercial bentonites.

Another object is to provide a novel method of forming a composition of matter containing fluff bentonite and, in intimate physical union or adsorption therewith, one or more water-dispersible substances adapted for adsorption by micelles of montmorillonite in a hydrosol thereof; examples of such adsorbable substances being active principles of drugs, organic and inorganic catalysts, bacterial toxins, antitoxins, vitamins, et cetera.

Another object is to provide a novel method of forming a composition of matter containing fluff bentonite and, adsorbed thereby, or entrained therein, material which is insoluble in water, but which is emulsifiable therein through the agency of a bentonite sol or gel; examples of such materials being rubber latex, alkyd resins, pitch, asphalt, and the like.

Other objects and uses of my invention will appear as the description thereof progresses.

My preferred practice of my novel process includes the following essential steps:

1. I first form a hydrosol of colloidal clay, preferably of sodium bentonite. The hydrosol contains preferably not substantially less than two per cent nor substantially more than fifteen per cent by weight of the bentonite. Hydrosols of low bentonite content are of advantage if dry products embodying my invention are desired wherein the bentonite units exhibit an expansion in the neighborhood of the maximum obtainable. The cost of production, however, of fluff bentonites tends to increase with diminution in the bentonite content of the materials because of the necessity of removing therefrom increasing proportions of (frozen) water.

To remove any undesirable grit from the hydrosol, I may permit it to stand until the grit settles out, and then separate the supernatant liquid therefrom; or I may pass the hydrosol through a centrifugal. If the end product is to contain some non-bentonitic material either adsorbed by, or agglutinated or in some other manner integrated with, the fluff bentonite, I dissolve or otherwise incorporate in the bentonite hydrosol a quantity of the non-bentonitic material suitably proportioned to the quantity of bentonite.

2. I next subject my bentonite hydrosol containing water-swollen bentonite micelles together with any non-bentonitic material present therein, to a degree of cold sufficient to freeze the hydrosol to a solid mass. The freezing step may be carried out in any suitable manner known to the art. If the hydrosol contains non-bentonitic material in suspension, and the latter tends to settle out, I ordinarily provide means for stirring the hydrosol until a slush forms, then I remove the stirring means, and continue the freezing until the hydrosol has congealed to a solid mass.

In quick freezing I subject the hydrosol preferably to a temperature within the range from about $-40°$ C. to about $-60°$ C. An effective method of such freezing—where the hydrosol does not contain settleable suspended matter—is to pour the hydrosol into a shallow pan of stainless steel or Monel metal, and then to set the pan on a flat metal surface which is in contact with the refrigerant. The latter may consist of dry ice incorporated in a mixture of about equal parts of ethylene glycol and butyl or amyl alcohol. Where the hydrosol requires to be stirred during the freezing step, I preferably employ individual containers, each holding from about a quart to a gallon of the hydrosol, and immersed directly in the refrigerant.

In slow freezing, I employ the same sorts of containers as in quick freezing; but the temperature of the refrigerant is higher, being preferably within the range from about $-15°$ C. to about $-30°$ C. My preferred refrigerant for slow freezing is the ordinary freezing brine employed in the manufacture of artificial ice.

I already have pointed out the advantage derived from working with hydrosols of low bentonite content, namely, to obtain dry products wherein the units exhibit substantially maximal expansion. Since, as I also have pointed out, the employment of dilute hydrosols entails the removal of large proportions of water, I may, in suitable cases, freeze a hydrosol in the following manner:

A quantity of the hydrosol is placed in a suitable metal, porcelain, or Pyrex container, which then is immersed in a refrigerant at not substantially lower than $-25°$ C. The hydrosol is stirred or agitated at a rate sufficient to produce uniform cooling throughout its mass. Eventually some degree of supercooling takes place, and then a slush suddenly forms, the solid particles thereof consisting of a mass of ice crystals substantially free of solute. These ice crystals are then separated from the interstitial hydrosol in any suitable manner, such as by filtration or by spinning the mixture in a perforated basket in the manner used in separating sugar crystals from mother liquors in the manufacture of cane sugar, or by other types of centrifugation. This separation of ice crystals should be carried out at a temperature just low enough to prevent melting of the crystals, but without causing the solidification of the mixture.

The filtrate or centrifugate separated from the ice crystals is then solidified by either quick or slow freezing in the manner above described.

The separated ice crystals may be melted and the liquid thus obtained used in forming other hydrosols.

Unless the hydrosol has been frozen in thin sheets, I next shave, chip or otherwise comminute the frozen mass into fragments preferably not larger than a marble. The purpose of this comminution is to increase the total surface of the frozen material relative to its mass, as well as to provide open spaces or interstices between the frozen fragments when they are piled together; and thus to facilitate the later sublimation of ice from the frozen material. I take care to prevent any appreciable melting of the frozen material while it is being comminuted.

3. The third step in my novel process is to cause the ice in the solidly frozen material to sublime to the vapor state without forming any liquid water. The water vapor must be removed as rapidly as possible from the vicinity of the frozen material so that the vapor pressure gradient between the ice in the frozen material and the contiguous atmosphere shall be as sharp as possible. The sublimation of the ice may be effected in any one of a number of ways.

(a) A current of dry air, sufficiently chilled so that melting of the frozen material is prevented, is drawn through the interstices between the fragments forming a layer or mass of the comminuted, frozen hydrosol, whereby it picks up a certain amount of water vapor. The air then is carried to a very cold condensing chamber where it gives up its water vapor. Or the water vapor may be removed from the air by passing it through or over an efficient desiccating agent such as magnesium chlorate, phosphorus pentoxide or concentrated sulfuric acid. The dried air then is chilled again and recycled through the frozen hydrosol.

(b) As an alternative to procedure (a) the frozen material is subjected to a high vacuum—i. e., preferably less than 0.1 mm. of mercury; and the water vapor from the subliming ice is then either condensed by a refrigerant at a temperature of about —50° C.; or it is absorbed by a desiccating agent, such as one of those mentioned just above, each of which has such an avidity for water that it can absorb a substantial quantity of water vapor without exhibiting any appreciable water vapor tension in its turn.

As long as conditions are maintained so that there is no liquefaction of water in the frozen hydrosol, sublimation of the ice proceeds inwardly in a frozen mass beginning at the surface. Not only is there a sublimation of the ice which, prior to the freezing operation, constituted substantially unpolarized solvent or dispersion medium between the micelles of expanded bentonite; but there is also a sublimation of the interplanar ice—that is, of frozen water which during the formation of the hydrosol had penetrated between, and expanded the sheets making up the ultimate bentonite units. The sublimation of the interplanar ice thus leaves each resulting bentonite unit as a minute expanded structure possessing the same mass that it had before its original expansion in the water, but bounding a much greater volume and exhibiting a much greater extension of surface.

After all of the ice has been sublimed from the hydrosol, the intermicellar ice spaces, as well as the interplanar spaces in each bentonite unit which had been occupied by ice are taken up by air. The result is an extremely light and fluffy product which, unless subjected to compression, occupies substantially the same volume as the frozen hydrosol from which it was derived. My novel fluff bentonites possess many remarkable properties some of the more outstanding of which are set forth in the paragraphs next below. I desire it to be understood, however, that the data thus set forth are illustrative only, and in no sense limitative of my broad invention.

The fluff bentonites derived from quickly frozen hydrosols are substantially white; those derived from slowly frozen hydrosols possess a light tan tint.

Freshly prepared fluff bentonites, when heated in an oven for three hours at 110° C., ordinarily do not lose more than two to three per cent in weight.

My novel fluff bentonites absorb moisture more rapidly from an atmosphere of given humidity than do typical bentonites; but the absolute weight of water absorbed by a unit weight of a fluff bentonite appears not to be greater than the weight of moisture absorbed over a longer period by a commercial bentonite. For example, a fluff bentonite absorbed in four days a maximum of 17.8 per cent of its weight as water vapor from a humid atmosphere. Under like conditions a standard powdered bentonite (200 mesh) gained 13 per cent of its weight in 4 days and a maximum of 19.8 per cent of its weight in 40 days.

*Weight/volume (W/V) of fluff bentonite.*—By "weight/volume" or "W/V" of fluff bentonite I mean the calculated weight, in pounds, of a cubic foot of the novel material. Its W/V varies somewhat with the method of test; but the following data serve to illustrate its lightness of weight upon comparison with W/V values of well-known commercial preparations of bentonite, under the same conditions of test. The commercial bentonites used for comparison comprised preparations marketed under the trade-mark "Volclay" by American Colloid Company. Three preparations of such bentonite were tested, namely, standard powdered bentonite—200 mesh; BC Volclay bentonite—micron-sized, the finest commercial form—used in cosmetic and pharmaceutical manufacture; and KWK Volclay bentonite—fine, evenly sized granules.

The W/V of fluff bentonite and of the several commercial bentonites was determined by obtaining the weight of a substantially constant volume of the material after it had been lightly packed in a jolting apparatus consisting of a 250 cc. graduate mounted in a frame with the base resting on rubber. By means of an electrical device the graduate was reciprocated vertically through a distance of 1¾ inches, fifty times per minute. With a given sample the jolting was continued until the material had been packed to constant level.

Two different samples of fluff bentonite, obtained from quickly frozen hydrosols, gave W/V values, respectively, of 2.63 lbs. and 2.72 lbs. The W/V of a fluff bentonite, obtained from a slowly frozen hydrosol, was 4.97 lbs. Under the same conditions of test the respective W/V values for the three different Volclay bentonites—standard powdered (200 mesh), BC and KWK—were 71.6 lbs., 34.3 lbs. and 65.2 lbs. The above W/V values are measures of apparent density.

*Viscosities of aqueous dispersions of fluff bentonite.*—The relative viscosities of freshly made 7.5 per cent hydrosols of representative fluff bentonites were compared with that of a 7.5 per cent hydrosol of KWK Volclay bentonite. The determinations were made in a Stormer viscosimeter at a constant cylinder speed of 600 R. P. M.

In the table below the relative viscosities of the 7.5 per cent aqueous dispersions of fluff bentonites are stated in terms of the viscosity value for the KWK bentonite, taken as unity. Each value relates to a different sample of fluff bentonite.

| Source of Fluff Bentonite | Relative Viscosity (KWK Volclay=1.00) |
| --- | --- |
| Quickly frozen, 2% hydrosol | 2.54 |
| Do | 2.50 |
| Quickly frozen, 4% hydrosol | 1.83 |
| Quickly frozen, 5% hydrosol | 1.81 |
| Slowly frozen, 2% hydrosol | 2.05 |
| Do | 1.70 |
| Slowly frozen, 4% hydrosol | 1.55 |
| Slowly frozen, 5% hydrosol | 1.72 |

Since the usefulness of a bentonite hydrosol as a suspending or thickening agent is a function of its viscosity, it is to be seen that hydrosols of my novel fluff bentonites—characterized by viscosities ranging from more than 50 per cent to more than 150 per cent higher than hydrosols of the same concentration, but made from un-fluffed bentonite—have a special field of usefulness as suspending, thickening or emulsifying agents.

*Retention of oil by fluff bentonite.*—Certain proprietary, non-swelling, Georgia and South Carolina clays—for example "Absorbo," "Flor-Dry" and "Speedi-Dri"—are sold for absorbing oil around machinery. The capacity for oil retention of my novel fluff bentonites was tested against that of a number of clays including the proprietary clays aforementioned, English fuller's earth, Panther Creek ((Mississippi) bentonite and samples of Volclay bentonites.

The method of determining oil retention was the following: A weighed quantity of the clay—ordinarily 9 grams—is stirred into 300 cc. of the oil, and the mixture is allowed to stand for five minutes. The mixture then is filtered with suction through filter paper in a Buchner funnel. Suction is maintained until filtration of the oil has ceased. The oil-soaked filter paper and the oily clay then are weighed and corrected for the weight of a blank oil-soaked filter paper prepared in like manner by filtering through it the same volume of oil, but without addition of clay.

Samples of my novel fluffy bentonites retained, without oozing, extraordinarily large proportions of oils such as a light lubricating (crank case) oil and an unbleached, prime summer yellow cottonseed oil. They formed with these oils waxy solids that could be cut into small pieces, which did not fuse together on standing in a container. Under compression the major portion of the retained oil could be expressed readily therefrom.

A fluff bentonite obtained from a quickly frozen, 5 per cent hydrosol, retained 690 per cent of its weight of the lubricating oil. The retention of the cottonseed oil by fluff bentonites and by other clay products is set forth in the following table:

| Sample | Retention of Cottonseed Oil, in per cent of dry clay |
| --- | --- |
| Fluff bentonite from quickly frozen 5% hydrosol | 503 |
| Fluff bentonite from slowly frozen 5% hydrosol | 183 |
| Absorbo | 61 |
| English fuller's earth | 57 |
| Flor-Dry | 63 |
| KWK Volclay bentonite | 10 |
| Panther Creek Bentonite | 29 |
| Speedi-Dri | 54 |
| Standard Powdered Volclay (200 mesh) bentonite | 23 |

The great capacity of my novel fluff bentonites for oil absorption not only finds a use in taking up oil around machinery, but also in preventing undesirable exudation of oil from commercial products, such as putty, peanut butter and the like.

It is manifest that my novel fluff bentonites are adapted for many and varied uses. In addition to the uses that I have indicated above, fluff bentonites may be employed as liquid absorbents in catamenial pads and diaper pads; as highly active adsorbents for poisonous gases and vapors, for drug principles, for organic and inorganic catalysts, for bacterial toxins and antitoxins, for vitamins, for rubber latex, for resin polymers, for dyes, and so forth; and for acoustic and thermal insulation.

It is my intention to claim all uses of my invention that may come within the legitimate scope of the appended claims.

I claim:

1. As a new product of manufacture, a substantially grit-free sodium bentonite in the form of a dry expanded lattice structure consisting of spaced lattice sheets, in which the lattice sheets occupy from 2 to 15% of the total volume occupied by the lattice structure and which, when the lattice sheets are jolted to constant level, weighs from about 2.63 to about 4.97 lbs. per cubic foot.

2. As a new product of manufacture, a substantially grit-free sodium bentonite in the form of a dry expanded lattice structure consisting of spaced lattice sheets, in which the lattice sheets occupy from 2 to 15% of the total volume occupied by the lattice structure and which, when the lattice sheets are jolted to constant level, weighs from about 2.63 to about 4.97 lbs. per cubic foot physically integrated with a substance from the group consisting of starch paste, starch glue, water-dispersible casein products and animal glue, said substance being capable of forming substantially rigid films in the dry state and being in sufficient amount to stiffen said bentonite sheets against compressive stresses.

3. As a product of manufacture, a dry sodium bentonite in the form of an artificially fluffy solid in expanded lattice form having an apparent density of from about 0.038 to about 0.070 of that of powdered natural sodium bentonite of 200 mesh, an uncompressed volume from about six times to about twenty-seven times the uncompressed volume of an equal weight of natural sodium bentonite which disperses in water to form a hydrosol of a viscosity of about one and one-half to about two and one-half times that of a hydrosol of natural sodium bentonite of the same concentration, and which absorbs from about its own weight up to about six times its weight of a substantially non-volatile oil.

PAUL BECHTNER.

REFERENCES CITED

The following references are of record in the file of this patent:

UNITED STATES PATENTS

| Number | Name | Date |
|---|---|---|
| 1,872,183 | Porter | Aug. 16, 1932 |
| 1,934,267 | Heyl | Nov. 7, 1933 |
| 1,935,176 | Connolly | Nov. 14, 1933 |
| 1,943,584 | Cross | Jan. 16, 1934 |
| 1,949,360 | Schorger | Feb. 27, 1934 |
| 2,166,074 | Reichel | July 11, 1939 |

OTHER REFERENCES

Deitz, "Bibliography of Solid Adsorbents," National Bureau of Standards, Washington, D. C. (1944), pages 280, 306.

Dept. of Commerce, Bureau of Mines Technical Paper 438, by Davis and Vacher, (1928), page 4.